June 17, 1969     W. H. AVREA     3,450,101
TIMED DISPENSER OF LIQUID AND SOLID FOOD FOR ANIMALS
Filed Nov. 9, 1967     Sheet 1 of 2
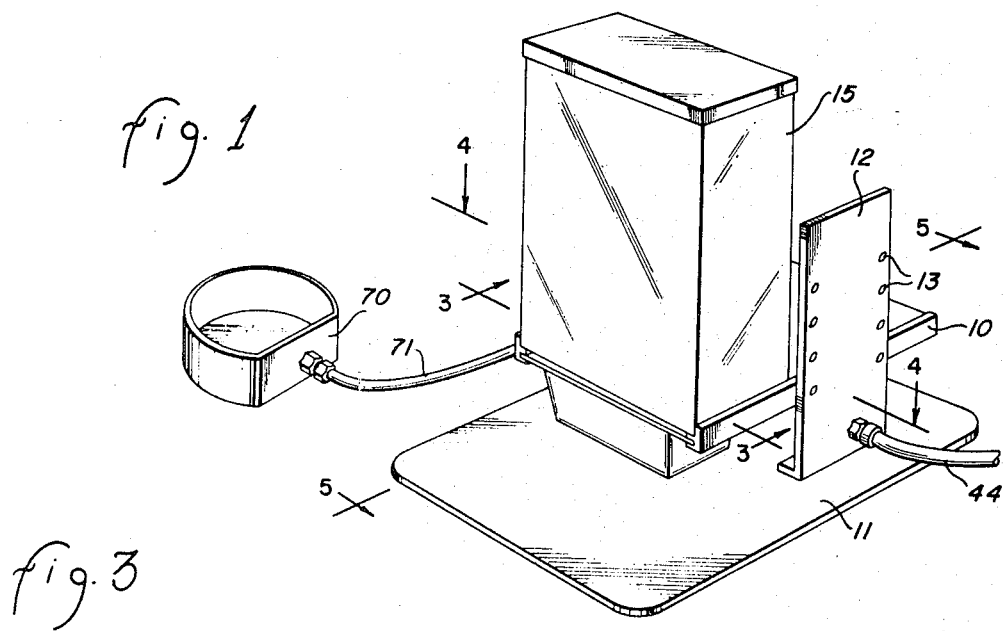
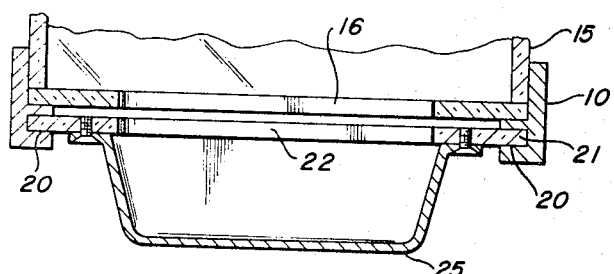
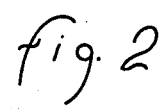
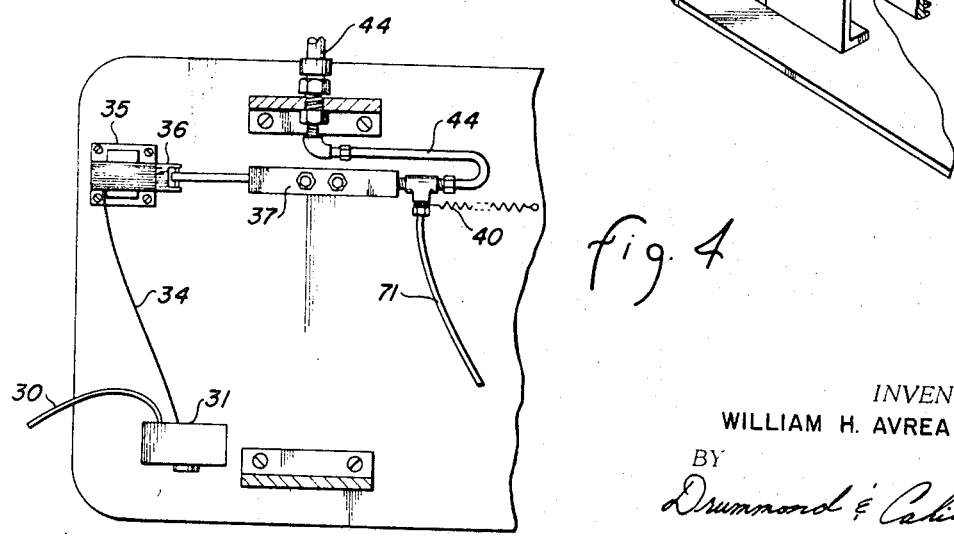
INVENTOR.
WILLIAM H. AVREA
BY
Drummond & Cahill
ATTORNEYS

United States Patent Office 3,450,101
Patented June 17, 1969

3,450,101
TIMED DISPENSER OF LIQUID AND SOLID FOOD FOR ANIMALS
William H. Avrea, 8730 E. Dianna Drive, Scottsdale, Ariz. 85257
Filed Nov. 9, 1967, Ser. No. 682,735
Int. Cl. A01k 5/02; B67d 5/08; G04c 23/38
U.S. Cl. 119—51.11
7 Claims

ABSTRACT OF THE DISCLOSURE

An automatic feeder utilizing a slidable tray having a food dispenser mounted thereon. The tray orients the dispenser with an opening in a food reservoir for filling the dispenser and subsequently extends the dispenser outwardly to permit the animal to feed from the dispenser.

The present invention pertains to automatic feeders, and more particularly, to an automatic feeder of the type useful for feeding domestic household animals.

Today it is very common for both husband and wife to be employed and to be absent from their home for extended periods of time. Pets such as dogs and cats are usually not acquired in such families for the simple reason that the animals would have to be left alone for those extended periods without attention. It is particularly necessary to provide food and water to animals when they are to be left for periods in excess of one day, such as when a family desires to leave for a weekend.

The prior art has suggested innumerable devices for automatically feeding animals at predetermined intervals; however, these devices have tended to be exceedingly cumbersome and complicated. Prior art devices have also tended to be bulky as a result of the utilization of extensive electrical equipment necessitating substantial power requirements for moving parts and mechanical linkages.

It is therefore an object of the present invention to provide an automatic feeder that is capable of being constructed of moderate size without sacrificing the feeding capacity of the device.

It is another object of the present invention to provide an automatic feeder that does not require large amounts of electrical power to operate mechanical elements.

It is still another object of the present invention to utilize the power available in the pressure of ordinary tap water to assist the operation of the feeder.

It is still another object of the present inventien to provide an economical and reliable automatic feeder wherein dry-type food may be dispensed and automatically mixed with water to provide the correct combination of water and feed.

Further objects and advantages of the present invention will become apparent to those skilled in the art as the description thereof proceeds.

Briefly, in accordance with the embodiment chosen for illustration, a sliding tray is provided with an opening therein having a food dispenser attached at the opening. A food reservoir is provided with an opening at the bottom corresponding in size to the opening in the sliding tray. When the tray is slid to a loading position, food from the reservoir passes through the opening in the bottom thereof into the food dispenser. When the tray is extended to a feeding position, the tray slides over the opening in the reservoir thereby blocking further loading of the feed and also providing the proper positioning of the dispenser for the animal to gain access thereto. The tray is powered by a cylinder and piston arrangement receiving water under pressure through a two-way valve. The valve is actuated by a solenoid energized through an electrical timer.

The present invention may more readily be described by reference to the accompanying drawings in which:

FIGURE 1 is a perspective view of an automatic feeder constructed in accordance with the teachings of the present invention.

FIGURE 2 is a perspective view of a portion of FIGURE 1 showing the timer face.

FIGURE 3 is a cross-sectional view of a portion of FIGURE 1 taken along line 3—3.

FIGURE 4 is a partial cross-sectional view of a portion of FIGURE 1 taken along line 4—4.

Figure 5:
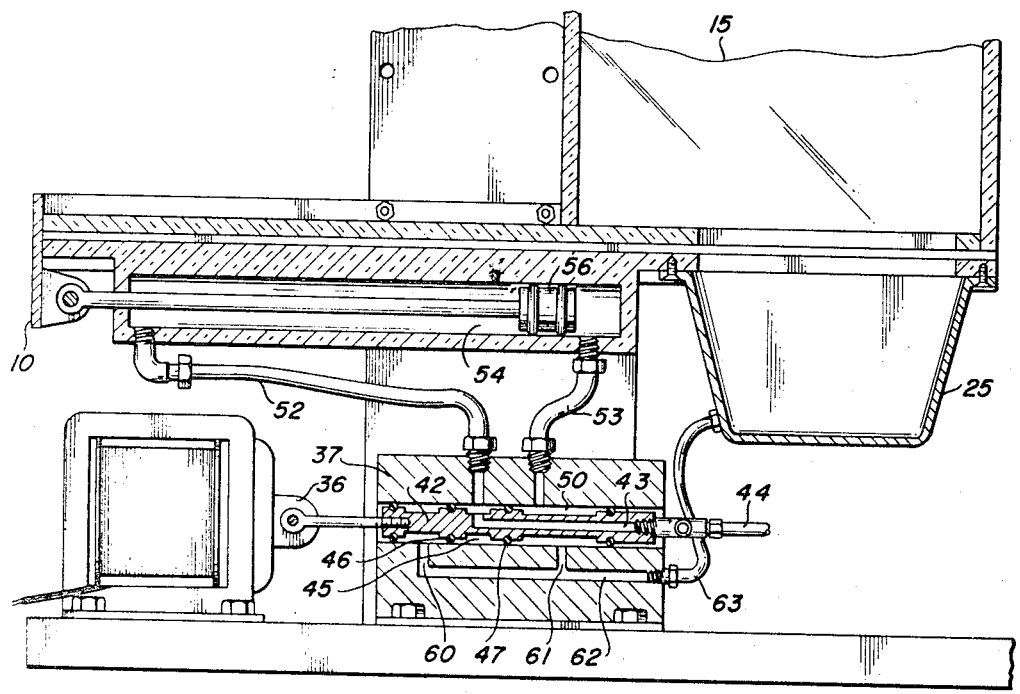
FIGURE 5 is a partial cross-sectional view of the device of FIGURE 1 taken along line 5—5.

Referring now to the drawings, a frame 10 is mounted on a support 11 through the expediency of a pair of vertical support plates 12 having a plurality of holes 13 therein to permit the frame 10 to be mounted at a predetermined desired height above the floor. The frame provides a support for a feed reservoir 15 having an opening 16 in the bottom thereof. The frame 10 also provides longitudinal tracks 20 therein for guiding a sliding tray 21. The tray 21 has an opening 22 therein corresponding in size to the opening 16. A dispenser 25 is secured to the bottom of the tray 21 and is mounted in registry with the opening 22. It may be noted that the dispenser 25 comprises a dish or pan that may conveniently be attached to the tray 21 in any manner; further, it is contemplated that a plurality of dispensers will be provided with the automatic feeder so that the owner may choose a dispenser of a particular size to correspond with the amount of feed to be given to the animal.

The feeder is connected to a conventional 110 v., 60-cycle power outlet through a conventional appliance conductor 30 which is connected directly to an electrical timer 31. The timer is a conventional timer readily available through a variety of sources and may be any one of several designs. The timer may generally be described as a clock-type mechanism having a wiper blade for an indicator; the blade will close an electrical contact at a time determined by the setting of a selector 32 on the face thereof and will maintain the contacts in a closed position until a second time is reached determined by the setting of a second selector 33. The timer 31 is connected through a conductor 34 to a solenoid 35 having an armature 36 connected to a double-acting valve 37. The double-acting valve 37 and the solenoid armature 36 are biased to an armature-extended position by a biasing spring 40. The double-acting valve includes an axially positionable piston 42 having a longitudinal bore 43 therein connected to a source of high-pressure fluid through a flexible conduit 44. The bore 43 communicates with a chamber 45 defined by the annular space around the diameter of the piston 42 between O-ring seals 46 and 47. The bore 50 of the valve 37 communicates through two flexible conduits 52 and 53 with a cylinder 54. A piston 56 is axially slidable in the cylinder 54 and divides the cylinder into two separate pressure chambers.

It may be noted that the cylinder 54 is formed in a solid sheet of rigid plastic material with the sliding tray so that movement of the cylinder is, in effect, movement of the sliding tray. The piston 56 is pivotally anchored to the frame 10. When pressure is applied to one side of the piston 56, the cylinder is forced to move away from the piston; however, the fluid on the opposite side of the piston must have a path of escape. Accordingly, the double-acting valve 37 is provided with fluid return passages 60 and 61 which communicate with a passage 62. A flexible conduit 63 carries the fluid from the passage 62 to the dispenser 25.

Figure 6:
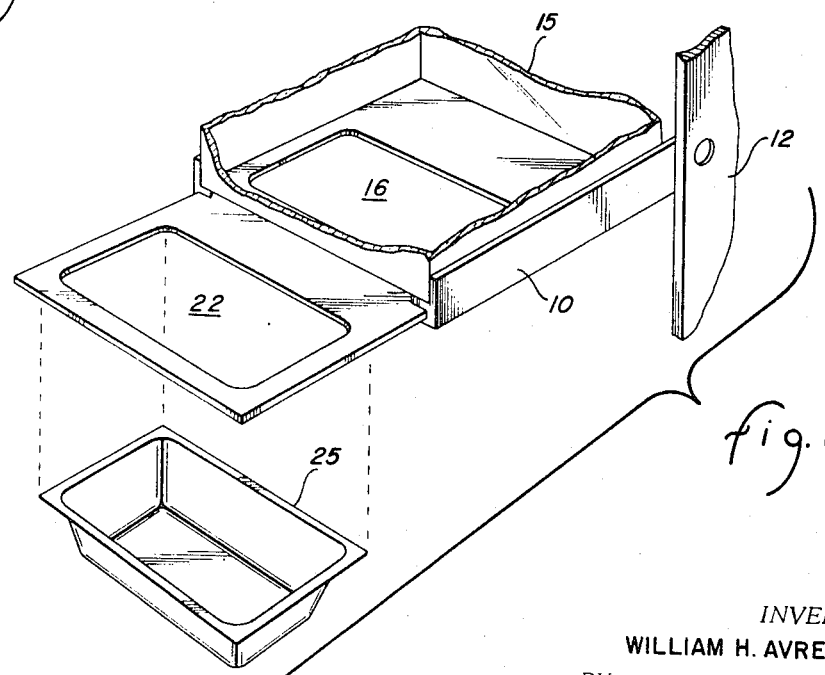
FIGURE 6 is a partially exploded, partially sectioned view of a portion of the apparatus of FIGURE 1 showing the sliding tray, food dispenser, and opening in the bottom of the food reservoir.

The operation of the feeder of the present invention may now be described. The feed reservoir 15 is loaded with any convenient type of animal food such as the presently popular "kibbled" feed. The biasing spring 40 assures that the dispenser is in the normally feeding position (e.g., the dispenser 25 is extended as in FIGURE 6 to permit the animal to gain access to the dispenser 25). The timer is then set so that a feeding cycle will be provided at a desired time. When that time is reached, the timer will energize the solenoid 35 which will attract the solenoid armature 36, causing the piston 42 of the two-position valve 37 to be drawn to the left (as viewed in FIGURES 4 and 5). The water pressure on the conduit 44 will be delivered through the bore 43, through the flexible conduit 52 into the cylinder 54 and will act upon the piston 56 to cause the cylinder, and therefore the sliding tray 21, to be pulled to the left thereby orienting the opening 22 and the dispenser 25 with the opening 16 in the reservoir 15. The feed contained in the reservoir 15 will obviously descend into the dispenser 25; after a predetermined time delay set in accordance with the timer 31, power will be removed from the solenoid 35 thereby permitting the biasing spring 40 to force the valve piston 42 to the right as viewed in FIGURES 4 and 5. Water under pressure will then be admitted through the bore 43 and the flexible conduit 53 to the opposite side of the piston 56 in the cylinder 54. Since the piston 56 is attached to the frame 10, the cylinder and the sliding tray will be forced outwardly to the right to an extended position remote from the feed reservoir 15. As the dispenser 25 passes from under the reservoir 15, the surface of the tray will block further downward movement of the feed stored in the reservoir 15.

It may also be noted that when the cylinder 54 travels to the right, the water trapped on the low pressure side of the piston 56 will travel back through the flexible conduit 52 to the bore 50 of the valve 37 and through the passages 60 and 62 to the flexible conduit 63 and ultimately to the dispenser 25 where it will be mixed with the feed that was placed there during the preceding loading cycle. It may be noted that it is not necessary to connect the flexible conduit 63 to the dispenser 25 and that the water normally flowing from the cylinder 54 may be accommodated in other ways. In FIGURE 1, a watering dish 70 is shown connected through flexible conduits 71 to the conduit 44 immediately adjacent the valve 37. The watering dish may contain a conventional float valve to maintain proper liquid height in the dish.

The present invention has been described in terms of a specific embodiment; however, it will be obvious to those skilled in the art that many modifications may be made in the embodiment chosen for illustration without departing from the spirit and scope of the invention. Accordingly, the present invention is intended to be limited only by the scope of the claims appended hereto.

What is claimed is:

1. An automatic feeder comprising: a food reservoir mounted on a frame and having an opening therein animal feeding means comprising; a food dispenser mounted on a sliding tray, said sliding tray having a loading position and a feeding position, said dispenser communicating with said reservoir through said opening when said tray is in said loading position for filling said dispenser, said dispenser extending away from said reservoir when said tray is in said feeding position to permit access to said dispenser; said sliding tray covering said openng when in said feeding position; a tray actuation means comprising: a piston axially movable within a cylinder having a first and a second piston position; a two-position fluid valve connected to receive liquid under pressure and to direct said liquid to said cylinder when said valve is in one of said valve positions; said piston responsive to liquid under pressure admitted to said cylinder for assuming said first piston position; means for returning said piston to said second position when said valve is placed in the other of said two valve positions; means connecting one of said piston and cylinder to said sliding tray and the other of said piston and cylinder to said frame, and means to discharge said liquid from said cylinder into said feeding means.

2. The combination set forth in claim 1 wherein said piston is a double-acting piston and wherein said two-position valve directs fluid to one side of said piston when in one valve position and to the other side of said piston when in the other of said valve positions whereby said piston assumes a first and a second piston position in response to the position of said valve.

3. The combination set forth in claim 1 wherein said two-position valve is connected to receive water under pressure from a household tap.

4. The combination set forth in claim 1 wherein a solenoid is connected to said two-position valve for forcing said valve to one of said two positions.

5. The combination set forth in claim 1 wherein a solenoid is connected to said two-position valve for forcing said valve to one of said two positions and wherein an electrical timer actuates said solenoid for a predetermined time at predetermined intervals.

6. The combination set forth in claim 1 wherein said cylinder and said tray are formed from a single sheet of material.

7. An automatic feeder comprising: a food reservoir mounted on a frame and having an opening therein; a food dispenser mounted on a sliding tray, said sliding tray having a loading position and a feeding position, said dispenser communicating wtih said reservoir through said opening when said tray is in said loading position for filling said dispenser, said dispenser extending away from said reservoir when said tray is in said feeding position to permit access to said dispenser; said sliding tray covering said opening when in said feeding position; a tray actuating means comprising: a double-acting piston axially movable within a cylinder having a first and a second piston position; a two-position fluid valve connected to receive water under pressure from a household tap and to direct said water to said cylinder at one side of said piston when in one valve position and to the other side of said piston when in the other of said valve positions whereby said piston assumes a first and a second piston position in response to the position of said valve; means connecting one of said piston and cylinder to said sliding tray and the other of said piston and cylinder to said frame; a flexible water connection between said two-position valve and said food dispenser, said valve receiving expelled water from said cylinder and providing said water to said food dispenser when said dispenser is extended from said reservoir.

References Cited

UNITED STATES PATENTS

| | | | |
|---|---|---|---|
| 754,230 | 3/1904 | McIntyre | 222—366 |
| 2,566,436 | 9/1951 | Waite | 222—129.2 |
| 2,791,984 | 5/1957 | Franklin | 119—51.12 |
| 2,808,969 | 9/1957 | Moravecky | 222—361 |
| 3,196,835 | 7/1965 | Bergenin | 119—51.11 |

ROBERT B. REEVES, *Primary Examiner.*

H. S. LANE, *Assistant Examiner.*

U.S. Cl. X.R.

119—51.5; 222—57, 70, 334, 361